United States Patent Office 2,762,692
Patented Sept. 11, 1956

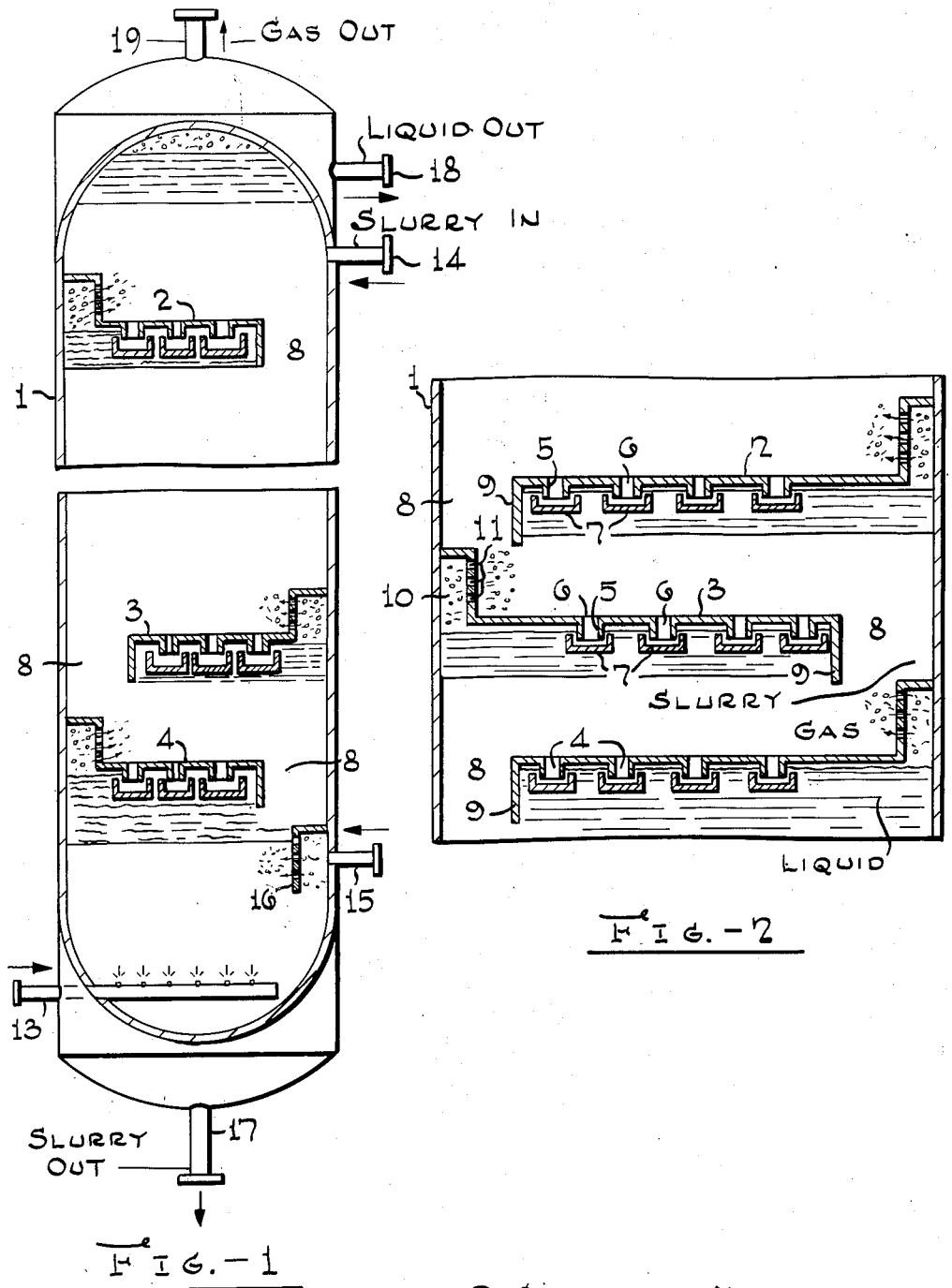

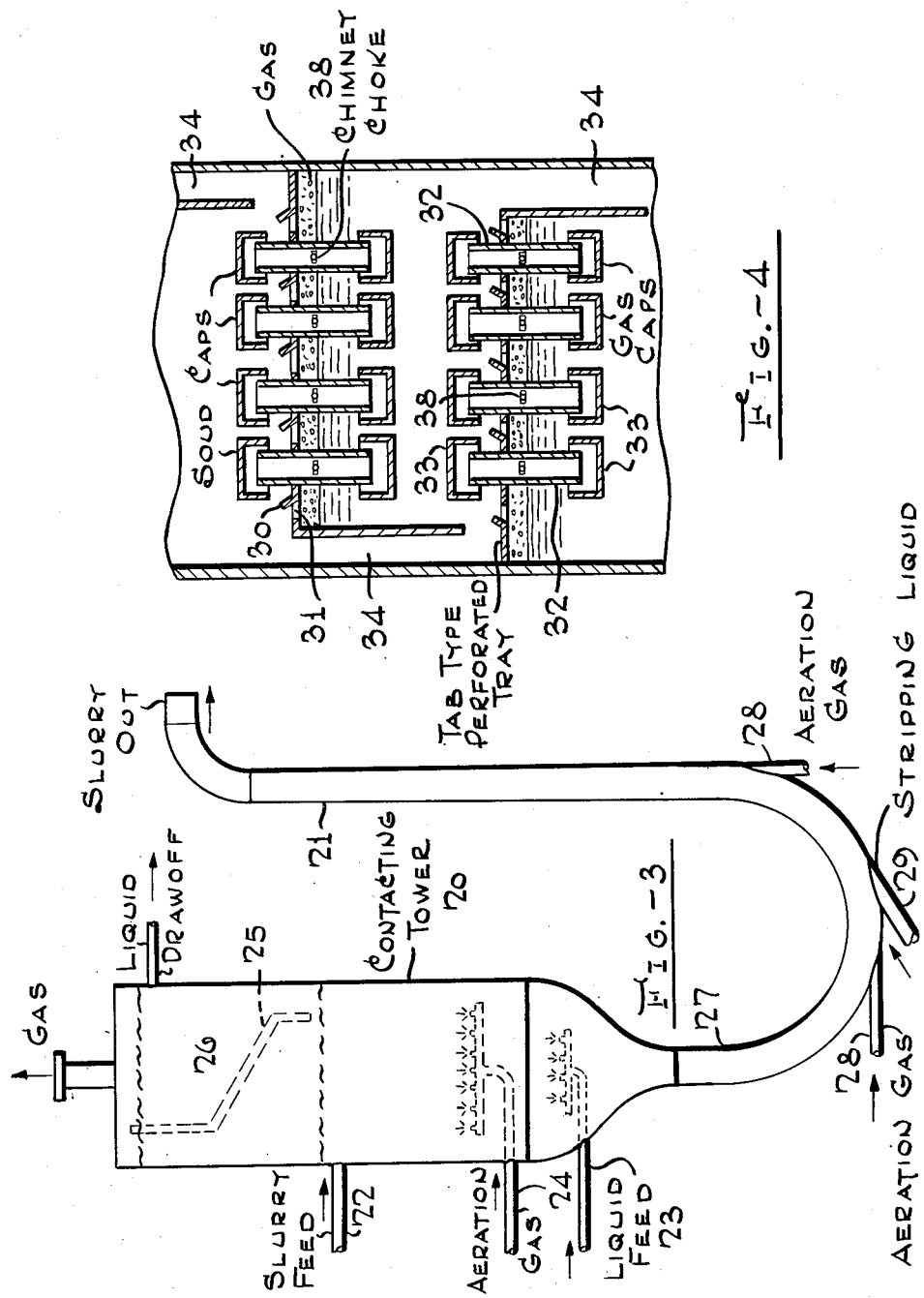

2,762,692

APPARATUS FOR SOLID-LIQUID CONTACTING

Peter H. Spitz, New Rochelle, N. Y., and Robert P. Cahn, Elizabeth, N. J., assignors to Esso Research and Engineering Company, a corporation of Delaware Application March 4, 1953, Serial No. 340,258

9 Claims. (Cl. 23—283)

This invention concerns an improved method and apparatus for the continuous contacting of a powdered or granular solid and a liquid. The invention particularly concerns apparatus and processing techniques utilizing an auxiliary gas as a contacting aid in solid-liquid contacting.

Many processes at the present time require the contacting of a liquid with solid particles; for example, the contact of a variety of feed liquids with solid adsorbent particles, the contacting of solid material with a leaching agent, the contacting of liquids with solid catalyst particles, etc. A number of methods and apparatus have been suggested for carrying out the requisite solid-liquid contacting. For many applications, batch contacting techniques are employed, utilizing fixed bed percolation or mechanical agitation of the solids and liquids. Methods have also been suggested for contacting solids with liquids on a continuous flow basis. Nonetheless, presently suggested contacting methods, particularly of the continuous countercurrent type, leave much to be desired and point the need to an improved method of securing efficient liquid-solid contacting. It is the principal object of this invention to provide a novel process (and apparatus to conduct this process) for securing continuous countercurrent contact of a liquid with solid particles, using auxiliary gas injection in an advantageous manner.

It is known that when solid particles are charged to a vessel in which liquid is flowing upwardly at less than the free settling rate of the solid particles, a slurry phase is formed. This slurry of solid particles is turbulent in nature, has a definite interface between it and clear liquid above it and can be withdrawn through a valve and otherwise handled as a liquid. The concentration of solids in the slurry decreases with increasing upward liquid velocity. In maintaining a suitable turbulent slurry phase for continuous countercurrent contacting, a number of difficulties are encountered however. One of the main limitations in a slurry processing operation is that the minimum velocity of the liquid necessary for fluidizing the slurry is a function of the viscosity of the liquid, the particle size and the density difference between liquid and solid. These factors impose severe restrictions on the solid to liquid ratios, solid and liquid throughputs, etc. Another problem in providing an attractive slurry contacting process concerns the method in which the slurry is to be moved from stage to stage in a contacting zone. Avoidance of undesired back mixing and maintenance of true countercurrent flow conditions are hard to obtain. It is the basic concept of this invention that these and other difficulties ordinarily associated with slurry contacting processes can be avoided by suitable use of an auxiliary injection gas.

In the simplest terms the present invention concerns a solid-liquid contacting operation in which gas is employed together with liquid to maintain efficient fluidization of the solid particles and to aid in the flow and handling of the solid particles from stage to stage or from a contactor to a successive treating zone. A basic advantage obtained by employing an auxiliary gas together with liquid for fluidizing solid particles is that the density of the light phase fluid present in the contacting zone can be decreased well below the density of the liquid. This can be carried out without appreciably decreasing the density of the slurry phase comprising the liquid admixed with the solid particles. As a result, a greater differential head can be maintained between the light phase and heavy phase constituents in contacting operations. This in turn makes possible attainment of different ranges of solid and liquid flow velocities than otherwise possible.

The use of an auxiliary gas in the slurry contacting of liquids and solids is again valuable in eliminating any restriction on the lower limit of operable liquid to solid ratios. Thus, for example, if it is desired to contact solid particles with relatively low proportions of a liquid, this can be successfully carried out in a slurry type contacting operation by employing auxiliary gas to supplement the small proportions of liquid employed.

In conventional types of contacting towers constituents to be contacted are commonly moved from side to side of the tower in advancing through different contacting stages. It is one of the features of this invention that auxiliary gas injection can be employed to promote side to side movement of liquid-solid slurries in this manner.

In accordance with this invention, a bed of solid particles is maintained on a support member which contains apertures through which gas and liquid can flow. As will be seen, it is preferred to use apertures of such a nature that liquid may flow upwardly through certain of them into the bed of solid particles while gas may flow through other of the apertures. Liquid is passed upwardly through the apertures throughout the horizontal extent of the bed to provide a superficial flow velocity less than the free settling rate of the solid particles. Particularly in the case when the liquid to solid ratio desired is small, gas is also passed upwardly through the apertures referred to. The upflowing gas and liquid converts the solid particles to a slurry condition. The slurried particles in this condition have all the properties of a liquid. In particular, the slurried particles may be run off the perforated support through a downcomer or over a weir to successive treating zones. Continuous flow contacting of the solid particles with a liquid becomes practical.

It is to be understood that this invention is of broad application to the contacting of virtually any particulate solids with virtually any liquids. However, the principal feature of the invention is the provision of true countercurrent contacting of liquids with solids. In most chemical reactions between solids and liquids, countercurrency is not an essential requirement. For this reason the process and apparatus of this invention is of particular application to liquid-solid systems which do not involve chemical reaction betwen the liquid and solid. For most applications therefore, this invention can best be used in contacting liquids with solids with which they do not react. Included within this class of processes are solid absorption processing, selective crystallization, and leaching. This invention is also of particular application to catalytic processes where a solid catalyst serves to catalyze a chemical reaction in a liquid phase material with which the catalyst is contacted. If the process is used in a chemical reaction between liquid and solid, the solid can be maintained in a fluidized state by passing liquid and gas upwardly through it, without maintaining countercurrency.

This invention can be applied to solids having a wide range of particle size. It is possible to use solids ranging upwardly in size to as much as ¼ inch in diameter or somewhat greater. It is preferred however, that the solids be no finer than about 200 mesh and for best results reasonably well classified material should be employed. For example, use of solids falling within the range of about 20 to 60 mesh is particularly desirable in the practice of this invention.

As indicated, a combination of gas and liquid is employed to suitably fluidize the solid particles to maintain the solids as a slurry phase. Employing minimum amounts of auxiliary gas injection, the maximum liquid velocity passed over the entire cross-sectional area of the contacting tower is generally about 1 to 5 feet per minute. This maximum liquid velocity depends upon the particle size of the solids, the viscosity of the liquid and the difference in density between the solid and the liquid. While as stated, the invention may be used with superficial liquid velocities as high as 1 to 5 feet per minute, at the same time, the invention is of particular application when employing liquid velocities below these upper limits. Sufficient auxiliary gas injection is then employed to supplement the lower liquid velocities employed so as to maintain effective fluidization of the solids.

For most applications the liquid in the system will constitute the light phase material while the solid and the solid slurry will constitute the heavy phase material. For this reason the solid or a solid slurry is generally introduced at the top of a contacting zone while introducing the liquid at the bottom of the contacting zone. The invention will be described with particular reference to such a system in which the solid particles are passed downwardly through a contacting zone countercurrent to a flow of liquid rising upwardly through the zone.

The accompanying drawings illustrate the principles of this invention and diagrammatically show preferred apparatus for carrying out the invention.

Figure 1 shows in cross-sectional elevational detail a complete contacting tower embodying the invention.

Figure 2 illustrates in enlarged cross-sectional detail the type of plate construction employed in the contacting tower of Figure 1.

Figure 3 shows an alternative form of contacting tower associated with a standpipe and transfer line for the transport of solids from the lower portion of the contacting tower to a successive treating zone.

Finally, Figure 4 illustrates an alternative form of contacting plate which can be employed in the general tower arrangement of Figure 1.

Referring first to Figure 1, a contacting tower 1 is shown which is simply an elongated vertically positioned vessel. A number of plate elements 2, 3, 4, etc., are positioned throughout the tower. The plate elements are particularly illustrated in Figure 2. Each of the plate elements constitutes a principal section which is a transversely positioned perforated plate. Chimneys 5 are mounted at the underside of each plate so as to communicate with the perforations 6 provided in the plates. As will be brought out, the perforations 6 are limited in size and effectively constitute orifices for the upward flow of liquid from plate to plate. Each of the downwardly dependent chimneys 5 is provided with an inverted bellcap 7, which is spaced from the lower termination of each chimney. The upwardly extending skirt of each bellcap rises to a point above the lower termination of each chimney so that a liquid sealed passage is provided upwardly over the skirt of the bellcap, and thence through the chimney 5 and orifice 6.

Each of the plate elements terminates at a spaced distance from one side of the tower 1. This provides a downcomer passageway 8 which is limited by a dependent baffle member 9 sealed to the termination of each plate element. While the plates illustrated are horizontally positioned, plates which are sloped toward the downcomer passages may advantageously be employed. At the opposed side of each plate element, an upwardly extending cell 10 is preferably provided. Cell 10 is equipped with perforations 11 in a well portion facing towards the interior of the contacting tower.

Employing this type of liquid-solid contacting arrangement, the liquid to be used in the contacting may be introduced through a lower inlet 13 associated with a header equipped with nozzles or perforations through which the liquid may be jetted into the lower portion of the contacting tower. Solid particles are brought into the upper portion of the tower through a line 14. It is preferable that the solids be pre-mixed with a liquid, similar to the one with which they are to be contacted, such as the tower overhead product, so as to form a slurry which can be pumped through line 14 for entry to the contacting tower. Alternatively, a hopper arrangement associated with a star feeder or the equivalent may be used to bring solids directly into the contacting tower. Finally, a gas inlet 15 is employed at the lower portion of the tower. A gas diffusing means 16, similar in nature to the cells 10 formerly described, may be used to secure the passage of gas into the lower portion of the contacting tower below the lowermost contacting plate.

In the dynamic operation of this process, gas jetted from perforations 11 is directed transversely across each plate member rising upwardly to accumulate below the next higher plate member and to flow upwardly to the next higher cell 10. Upwardly flowing gas cannot pass through the chimney elements 5 since these elements are liquid sealed as formerly brought out. A heavy slurry phase will pass successively from plate to plate downwardly through the tower. On each plate the slurry phase will pass transversely from a downcomer 8 on one side of the tower to a downcomer 8 on the opposite side of the tower. This flow of the slurry phase will be aided by the transverse gas injection across each plate which has been described. Finally, upflowing liquid may pass through the chimney elements 5 and through the orifices 6 for flow upwardly through the tower. This upward flow of liquid through the orifices 6 will prevent the flow of slurry phase downwardly through the orifices and chimneys. It is apparent that solid particles carried downwardly through the tower transversely across each of the plate members will be efficiently contacted by liquid flowing upwardly through the chimney elements. A treated slurry phase can then be withdrawn at the bottom of the tower through line 17 while the treating liquid is withdrawn at the top of the tower through line 18. A gas outlet 19 is also provided at the top of the tower.

Flow conditions in the tower, in conjunction with the design factors of plate spacing, orifice diameters etc., are adjusted so that partial settling of the slurry phase occurs on each of the plates. Consequently, a substantially clear liquid phase exists above the slurry on each of the plates so that the process can continue as described. Partial settling of the slurry occurs on each plate as the slurry moves across the plate and the injected gas rises through the slurry. This factor and the absence of upflowing fluid below the downcomers results in the existence of a slurry of high density in each of the downcomer passageways 8. The partially settled slurry in each of the downcomers provides the necessary gravity differential with respect to the light phase gas and liquid mixture for efficient operation of the tower at high liquid and solid throughputs. It will be observed that in this embodiment of the invention, essentially independent channels of flow are provided for the gas, the liquid, and the solid particles in the tower. Gas is injected transversely across each plate into the slurry phase to aid the fluidization of the solid particles and to drive the slurry phase across the plate. The gas accumulates below the next higher plate to flow through successive transversely directed orifices. Liquid flows upwardly through the tower, passing through the bubble caps provided. The upward flow of the liquid is combined with transverse flow component contributed by the injected gas. Solid particles pass from side to side in the tower and downwardly through the orifices provided. The liquid serving to fluidize the solids changes as the solids move across each plate and through each downcomer.

It is a particular feature of the process of this invention that continuous flow of treated solids from the contacting zone is possible. This is particularly illustrated in Figure 3 intended to show the transfer of treated solid particles from a contacting tower 20 through a transfer line 21. Contacting tower 20 may be identical in nature to contacting tower 1 which has been described. For purposes of example contacting tower 20 is however illustrated as an unpacked contacting zone. It is to be understood that if desired, bubble cap plates, packing material, or other contacting means can be used in tower 20. Slurry feed is brought into tower 20 through a line 22 near the upper portion of the tower. This slurry phase generally drops downwardly through the tower countercurrent to an upward flow of treating liquid introduced through line 23 at the lowermost portion of the tower. In addition, an aeration gas 24 is also brought into the lower portion of the tower to aid the liquid in fluidizing the downwardly flowing solid particles. The upward portion of tower 20 above the slurry feed line 22 constitutes a settling section wherein the upwardly flowing liquid and gas are separated from the solid particles. A baffle 25 may advantageously be employed in the settling section having the effect of providing a quiescent settling zone 26 wherein solids can settle from upwardly flowing gas and liquid to drop downwardly in the tower.

Partially settled slurry is withdrawn from the lowermost portion of the tower through line 27. An aeration gas 28 may be introduced into a lower portion of conduit 27 directed as shown to force the withdrawn slurry phase towards the right of the drawing to and through transfer line 21. This transfer of the solid-liquid slurry may be accompanied by introduction of a stripping liquid through line 29, which can be used to further treat the solid particles during transfer as well as aiding in the transfer. By this means it is possible to secure the flow of the slurry upwardly through line 21 to any desired elevation for introduction to successive treating stages or to other types of treating arrangements.

Referring now to Figure 4, an alternative form of contacting plate is illustrated which may be considered a modification of the plate elements shown in Figure 2. In the apparatus of Figure 4 each of the plate structures 30 are provided with a multitude of upwardly inclined punched tab elements. Each of these elements provides a perforation 31 for the upward flow of gas while at the same time providing an inclined baffle for the transverse direction of the upflowing gas. Chimney elements 32 constituting cylinders extending upwardly and downwardly from each of the plate elements are also employed. Each end of the chimney 32 is fitted within a bellcap member 33 in the manner described in connection with Figure 1. Downcomer passages 34 are provided from each plate element on alternate sides of the tower. Flow control vanes or chokes 38 may be employed in the chimneys.

The plate structure of Figure 4 operates analogously to the plate of Figure 1. An upwardly flowing gas phase will be trapped beneath each of the plate elements and will pass upwardly through the perforated tray to the next higher plate area. The perforations are such as to cause the direction of the upflowing gas phase transversely across the plate to aid the flow of slurry from one side of the plate across the plate to the downcomer on the opposite side of the plate. Liquid flows generally vertically through the tower through the chimneys 32 provided. The bellcaps at the lower terminations of the chimneys prevent gas from flowing upwardly through the chimneys while permitting liquid flow. Similarly, the bellcaps at the upper terminations of the chimneys prevent the downward flow of slurry phase through the chimneys while permitting the flow of liquid through the chimneys.

From the embodiments of the invention described, it will be seen that the present invention embraces the use of auxiliary gas injection and flow to assist the continuous fluidized contacting of solid particles with a liquid. The gas employed will generally constitute an inert gas although a gas which is reactive with the solid particles or liquid can be used in many applications. Again, for example, the gas can constitute vapors of the liquid employed in the process.

The process described is of particular application to the continuous countercurrent contacting of a liquid with solid adsorbents of the character of silica gel for example. An inert gas such as air or nitrogen will preferably be employed in this application.

The contacting principles of this invention are also applicable to processes in which the fluidizing gas takes part in a chemical reaction with either the liquid or solids present. For example, in the refining of oil products by hydrogenation, solid hydrogenation catalysts may be slurried by the oil fraction to be refined. Hydrogen may then be introduced to perform the fluidizing functions referred to herein, while reacting with the oil, in part, to secure the desired refinement.

In processes such as dewaxing of petroleum oils, or crystallization processes generally, the fluidizing gas may constitute a refrigerant such as ammonia, propane, or carbon dioxide. In other processes, the fluidizing gas may constitute a product of a reaction occurring in the system or may constitute the vapor of the liquid being treated.

What is claimed is:

1. Apparatus for use in countercurrently contacting solid particles in the form of a slurry and liquids including a support member having a first group of liquid sealed ports therein adapted to permit the flow of liquid upwardly therethrough but preventing the flow of gas therethrough, said support member having a second group of ports therein positioned in said support member above said first group of ports and adapted to permit the flow of gas therethrough, means about the support member to provide lateral support for material thereon, inlet means above said support member to admit slurried solid particles to the support, outlet means positioned below said support member and spaced from the inlet means to withdraw slurried particles from the support, liquid inlet means to conduct liquid to said first group of ports, gas inlet means to conduct gas to said second group of ports, and dividing means to separate the slurried extending across the support member into a plurality of sections without breaking the flow of slurried particles from the inlet to the outlet.

2. The apparatus defined by claim 1 in which the said plurality of sections are superimposed and the said dividing means are downcomer partitions.

3. The apparatus defined by claim 1 in which the said first group of ports include a liquid seal arrangement.

4. The apparatus defined by claim 1 in which the said second group of ports are transversely directed to cause gas flow therethrough towards the said outlet means.

5. The apparatus defined by claim 1 in which the said first group of ports include a chimney element downwardly dependent from the support member and an inverted imperforate bubble cap member below the said chimney element.

6. The apparatus defined by claim 1 in which the said second group of ports comprise punched tab elements.

7. The apparatus defined by claim 1 in which solid packing material is provided on the said support member.

8. The apparatus defined by claim 1 in which the said support member is sloped in the direction of solid flow from the inlet to the outlet.

9. A contacting apparatus adapted for countercurrently contacting a heavier phase and a lighter phase comprising a vessel, a series of vertically spaced transverse plates within said vessel, each of said plates having a relatively horizontal portion extending over a larger portion of the transverse area of said vessel, each of said plates being provided with a downturned weir at one side thereof, each of said plates being provided with an upturned weir at the other side of said horizontal portion extending over a larger portion of the transverse area of said vessel, each of said plates having a relatively horizontal portion attached to the upper end of said upturned weir extending over a smaller portion of the transverse area of said vessel and also being attached to said vessel, each of said plates being provided with primary ports in the horizontal portion extending over a larger portion of the transverse area of said vessel, inverted bell caps being provided below each of said primary ports, said inverted bell caps being positioned above the lip of said downturned weir, a plurality of secondary ports being provided in said upturned weir, means for introducing the heavier phase in the upper area of said vessel and means for withdrawing the lighter phase in the upper area of said vessel, means for introducing the lighter phase in the bottom of said vessel and means for withdrawing the heavier phase from the bottom of said vessel, an additional means for introducing a gaseous substance below the lowest plate.

References Cited in the file of this patent

UNITED STATES PATENTS

| | | |
|---|---|---|
| 1,904,133 | Gohr | Apr. 18, 1933 |
| 1,972,948 | Payne | Sept. 11, 1934 |
| 2,154,144 | Albin | Apr. 11, 1939 |
| 2,438,029 | Atwell | Mar. 16, 1948 |
| 2,520,391 | Findlay | Aug. 29, 1950 |
| 2,556,301 | Squires | June 12, 1951 |
| 2,609,277 | McNamara | Sept. 2, 1952 |
| 2,632,720 | Perry | Mar. 24, 1953 |
| 2,688,646 | Russell | Sept. 7, 1954 |